(12) United States Patent
Ishikawa et al.

(10) Patent No.: US 8,783,668 B2
(45) Date of Patent: Jul. 22, 2014

(54) FLUID-FILLED TYPE VIBRATION DAMPING DEVICE

(71) Applicant: Tokai Rubber Industries, Ltd., Aichi (JP)

(72) Inventors: Ryota Ishikawa, Aichi (JP); Yuichi Ogawa, Kasugai (JP); Noriaki Yoshii, Nagoya (JP)

(73) Assignee: Tokai Rubber Industries, Ltd., Aichi (JP)

( * ) Notice: Subject to any disclaimer, the term of this patent is extended or adjusted under 35 U.S.C. 154(b) by 0 days.

(21) Appl. No.: 13/677,650

(22) Filed: Nov. 15, 2012

(65) Prior Publication Data

US 2013/0069289 A1  Mar. 21, 2013

Related U.S. Application Data

(63) Continuation of application No. PCT/JP2012/003328, filed on May 22, 2012.

(30) Foreign Application Priority Data

May 23, 2011 (JP) ................................. 2011-114388

(51) Int. Cl.
 *F16F 13/00* (2006.01)
(52) U.S. Cl.
 USPC ................................. 267/140.13; 267/140.11
(58) Field of Classification Search
 CPC ...... F16F 13/105; F16F 13/106; F16F 13/107
 USPC ...................................... 267/140.311, 140.13
 See application file for complete search history.

(56) References Cited

U.S. PATENT DOCUMENTS

| 6,505,822 B1* | 1/2003 | Yamamoto et al. ...... 267/140.13 |
| 6,536,113 B2* | 3/2003 | Guillemot ................. 29/896.93 |

(Continued)

FOREIGN PATENT DOCUMENTS

| JP | 2001-200883 | 7/2001 |
| JP | 2007-51713 | 3/2007 |

(Continued)

OTHER PUBLICATIONS

International Search Report and English translation thereof, mail date is Jun. 26, 2012.

(Continued)

*Primary Examiner* — Thomas Irvin
(74) *Attorney, Agent, or Firm* — Greenblum & Bernstein P.L.C.

(57) ABSTRACT

A fluid-filled type vibration damping device including an elastic movable member attached to a partition member. The elastic movable member includes a clasped portion clasped by the partition member and a switching portion provided to an outer peripheral side of the clasped portion and positioned within a second orifice passage. An abutting portion is provided to the switching portion and projects to lengthwise opposite sides of the orifice passage. A switching mechanism is constituted for opening the orifice passage through a gap formed between the switching portion and the inside face of the orifice passage while closing the orifice passage by abutment of the abutting portion against the inside face of the orifice passage by means of a tilting motion of the switching portion relative to the clasped portion through elastic deformation of a thin portion provided between the clasped portion and the switching portion.

6 Claims, 5 Drawing Sheets

(56) References Cited

U.S. PATENT DOCUMENTS

| | | | |
|---|---|---|---|
| 6,619,636 B2* | 9/2003 | Yamamoto et al. | 267/140.13 |
| 8,424,854 B2* | 4/2013 | Ichikawa et al. | 267/140.13 |
| 8,490,954 B2* | 7/2013 | Saito et al. | 267/140.13 |
| 8,556,239 B2* | 10/2013 | Okumura et al. | 267/140.13 |
| 2011/0006466 A1 | 1/2011 | Ichikawa et al. | |
| 2011/0101581 A1* | 5/2011 | Kubo et al. | 267/140.13 |
| 2012/0049423 A1* | 3/2012 | Ishikawa et al. | 267/140.13 |

FOREIGN PATENT DOCUMENTS

| | | |
|---|---|---|
| JP | 2007-155033 | 6/2007 |
| JP | 2007-270910 | 10/2007 |
| JP | 2008-2618 | 1/2008 |
| JP | 2009-138847 | 6/2009 |
| JP | 2009-243511 | 10/2009 |
| JP | 2011-64232 | 3/2011 |
| WO | 2011/145656 | 11/2011 |

OTHER PUBLICATIONS

English language translation of International Preliminary Report on Patentability, mail date is Dec. 5, 2013.

China Office action, dated Feb. 18, 2014 along with an english translation thereof.

* cited by examiner

FLUID-FILLED TYPE VIBRATION DAMPING DEVICE

INCORPORATED BY REFERENCE

The disclosure of Japanese Patent Application No. 2011-114388 filed on May 23, 2011 including the specification, drawings and abstract is incorporated herein by reference in its entirety. This is a Continuation of International Application No. PCT/JP2012/003328 filed on May 22, 2012.

BACKGROUND OF THE INVENTION

1. Field of the Invention

The present invention relates generally to a fluid-filled type vibration damping device used for an automotive engine mount or the like. More particularly, the present invention pertains to a fluid-filled type vibration damping device capable of achieving vibration damping effect based on flow action of a fluid with respect to any of two or more vibration inputs having different frequencies.

2. Description of the Related Art

Conventionally, there is known a vibration damping device interposed between components that make up a vibration transmission system so as to elastically connect or elastically support those components. A fluid-filled type vibration damping device, which is one type of the vibration damping device, is adapted for use as an automotive engine mount or the like. The fluid-filled type vibration damping device includes a first mounting member, a second mounting member, a main rubber elastic body elastically connecting the first and second mounting members, a partition member supported by the second mounting member, and a pressure-receiving chamber and an equilibrium chamber disposed on either side of the partition member. The pressure-receiving chamber whose wall is partially defined by the main rubber elastic body is adapted to give rise to internal pressure fluctuations, while the equilibrium chamber whose wall is partially defined by a flexible film is adapted to permit changes in volume. A non-compressible fluid fills each of the chambers. In addition, the pressure-receiving chamber and the equilibrium chamber are interconnected through a first orifice passage and a second orifice passage, with the second orifice passage tuned to a higher frequency than the first orifice passage. At times of vibration input, a fluid flow will be produced between the pressure-receiving chamber and the equilibrium chamber so as to exhibit vibration damping effect based on resonance action or other flow action of the fluid. Japanese Unexamined Patent Publication No. JP-A-2007-155033 discloses one example of such a fluid-filled type vibration damping device, in which the second orifice passage is constituted by upper and lower through holes and a housing space of a movable rubber plate.

The fluid-filled type vibration damping device incorporating the first orifice passage and the second orifice passage having different tuning frequencies is sometimes furnished with a switching mechanism. This switching mechanism switches the second orifice passage, which is tuned to the higher frequency, between open state and closed state in order to effectively exhibit vibration damping effect of both orifice passages. Specifically, JP-A-2007-155033 discloses that the movable rubber plate is disposed on the path of the second orifice passage. At times of input of low-frequency, large-amplitude vibration, the movable rubber plate is pressed against the partition member while blocking off the upper and lower through holes, thereby closing the second orifice passage. This will ensure a sufficient amount of fluid flow through the first orifice passage.

However, with the fluid-filled type vibration damping device disclosed in JP-A-2007-155033, an impact during abutment of the movable rubber plate against the partition member may be transmitted as a noise to the vehicle body via the second mounting member. In particular, with the switching mechanism by means of the movable plate, the direction of exertion of pressure on the movable plate is generally coincident with the direction of abutment of the movable plate against the partition member. Accordingly, a differential in fluid pressure between the pressure-receiving chamber and the equilibrium chamber is likely to exert on the movable plate as an accelerating force, so that possible striking noise during abutment between the movable plate and the partition member tends to be a problem. Moreover, the movable plate is not supported by the partition member and freely displaces in the housing space without being appreciably decelerated. This makes it difficult to reduce the impact during the abutment.

SUMMARY OF THE INVENTION

It is therefore one object of this invention to provide a fluid-filled type vibration damping device of novel construction which is able to switch the second orifice passage between open and closed states so as to obtain excellent vibration damping effect, as well as to reduce striking noise generated during switching the second orifice passage between open and closed states.

A first mode of the present invention provides a fluid-filled type vibration damping device including: a first mounting member; a second mounting member having a cylinder portion; a main rubber elastic body elastically connecting the first and second mounting members; a partition member supported by the second mounting member; a pressure-receiving chamber whose wall is partially defined by the main rubber elastic body; an equilibrium chamber whose wall is partially defined by a flexible film, the pressure-receiving chamber and the equilibrium chamber being disposed on either side of the partition member and filled with a non-compressible fluid; a first orifice passage and a second orifice passage interconnecting the pressure-receiving chamber and the equilibrium chamber, with the second orifice passage being tuned to a higher frequency than the first orifice passage; and an elastic movable member attached to the partition member, wherein a clasped portion clasped by the partition member is provided to the elastic movable member, and a switching portion is provided to an outer peripheral side of the clasped portion and positioned on a fluid flow path of the second orifice passage, while fluid pressure of the pressure-receiving chamber is exerted on one side of the switching portion and fluid pressure of the equilibrium chamber is exerted on another side of the switching portion, wherein an abutting portion is provided to the switching portion so as to project to opposite sides as viewed in a lengthwise direction of the second orifice passage, wherein a thin portion is provided between the clasped portion and the switching portion so that a tilting motion of the switching portion is permitted relative to the clasped portion through elastic deformation of the thin portion, and wherein a switching mechanism is constituted for opening the second orifice passage through a gap formed between an outside peripheral face of the switching portion and an inside face of the second orifice passage while closing the second orifice passage by means of the tilting motion of the switching portion around the thin portion relative to the clasped portion based on relative pressure fluctuations of the pressure-receiving chamber and the equilibrium chamber so that an outside peripheral face of the abutting portion of the switching portion comes into abutment against the inside face of the second orifice passage.

With the fluid-filled type vibration damping device according to the above first mode, at times of input of low-frequency, large-amplitude vibration to which the first orifice passage is tuned, the second orifice passage is closed by the switching portion of the elastic movable member. Thus, sufficient amount of fluid flow can be obtained through the first orifice passage, thereby effectively attaining vibration damping action based on flow action of the fluid.

In addition, the switching portion undergoes a tilting motion relative to the clasped portion so that the abutting portion of the switching portion comes into abutment against the inside face of the second orifice passage. Accordingly, the direction of action of the fluid pressure on the switching portion and the direction of abutment of the abutting portion against the inside face of the second orifice passage are different from each other. Therefore, impact force of the abutment that acts during closing the second orifice passage will be reduced, thereby preventing occurrence of the striking noise.

Moreover, the switching portion is elastically supported with respect to the clasped portion via the thin portion. Thus, as the amount of the tilting motion of the switching portion becomes larger, the shape restoring action based on the elastic force of the thin portion will be more strongly exhibited, thereby limiting speed of the tilting motion. Accordingly, the impact energy during the abutment will be decreased, so that occurrence of the striking noise is avoided.

At times of input of relatively high-frequency, small-amplitude vibration to which the second orifice passage is tuned, the tilting motion of the switching portion will be limited. Accordingly, the gap formed between the outside peripheral face of the switching portion and the inside face of the second orifice passage places the second orifice passage in the open state. Therefore, vibration damping effect by the second orifice passage will be exhibited, realizing excellent vibration damping ability against the vibration of higher frequency than the tuning frequency of the first orifice passage.

Furthermore, at times of input of vibration of higher frequency than the tuning frequency of the second orifice passage, the switching portion undergoes displacement with minute amplitude. Consequently, the fluid pressure of the pressure-receiving chamber will be transmitted to the equilibrium chamber and absorbed by volume changes of the equilibrium chamber so as to avoid a marked development of high dynamic spring. This makes it possible to obtain excellent vibration damping ability with respect to the vibration of higher frequency than the tuning frequency of the second orifice passage as well.

A second mode of the present invention provides the fluid-filled type vibration damping device according to the first mode wherein the elastic movable member has an annular shape, and both of the clasped portion and the switching portion are provided continuously about an entire circumference of the elastic movable member.

According to the second mode, since the clasped portion is provided continuously about the entire circumference, the elastic movable member is stably supported by the partition member. Besides, since the switching portion is provided continuously about the entire circumference, it is possible to ensure a large passage cross sectional area of the second orifice passage without needing increase in size of the partition member in the diametrical direction. This will attain a greater degree of freedom in tuning of the second orifice passage. Moreover, when closing the second orifice passage, the outside peripheral face of the switching portion comes into abutment against the inside face of the second orifice passage about the entire circumference. This makes it possible to close the second orifice passage without leakage of the fluid, thereby efficiently preventing escape of the fluid pressure. Note that the switching portion, because of being provided to the outer peripheral side of the clasped portion, is permitted tilting motion even though provided continuously about the entire circumference.

A third mode of the present invention provides the fluid-filled type vibration damping device according to the first or second mode wherein the thin portion is constricted in width, and a regulating mechanism for regulating an amount of the tilting motion of the switching portion relative to the clasped portion is constituted by means of abutment between the switching portion and the clasped portion at the thin portion.

According to the third mode, the regulating mechanism is provided so as to regulate the amount of the tilting motion of the switching portion with respect to the clasped portion. With this arrangement, at times of input of low-frequency, large-amplitude vibration, the switching portion is stably retained by the regulating mechanism at the closing position of the second orifice passage. Thus, ample amount of fluid flow through the first orifice passage is more efficiently obtained, making it possible to advantageously exhibit desired vibration damping effect.

A fourth mode of the present invention provides the fluid-filled type vibration damping device according to any one of the first through third modes wherein the abutting portion is provided at an outer peripheral edge of the switching portion.

According to the fourth mode, even where the gap between the switching portion and the inside face of the second orifice passage is the same, the outside peripheral face of the abutting portion comes into abutment against the inside face of the second orifice passage and closes the second orifice passage at the stage where the amount of the tilting motion of the switching portion relative to the clasped portion is relatively small. Therefore, it is possible to ensure a large gap between the switching portion and the inside face of the second orifice passage so as to obtain a sufficient passage cross sectional area of the second orifice passage, while being capable of closing the second orifice passage during input of low-frequency, large-amplitude vibration.

A fifth mode of the present invention provides the fluid-filled type vibration damping device according to the fourth mode wherein the switching portion progressively becomes thicker towards an outer peripheral side, while the abutting portion progressively becomes narrower towards a projecting distal end thereof.

According to the fifth mode, the abutting portion comes into abutment starting with its narrow distal end against the inside face of the second orifice passage. Thus, effective cushioning action will be exhibited during the abutment, thereby preventing occurrence of the striking noise. Besides, the abutting portion progressively becomes wider towards its proximal end, so that as the amount of the tilting motion of the switching portion increases, the force for limiting the tilting motion becomes larger on the basis of elasticity of the abutting portion. This will limit the tilting motion of the switching portion at the closing position of the second orifice passage, whereby desired vibration damping effect is achieved.

A sixth mode of the present invention provides the fluid-filled type vibration damping device according to any one of the first through fifth modes wherein a valve portion is integrally formed on an inner peripheral side of the clasped portion, wherein a short-circuit passage is formed in the partition member for interconnecting the pressure-receiving chamber and the equilibrium chamber, and the valve portion is disposed on the short-circuit passage, and wherein a relief mechanism is constituted for closing the short-circuit passage by means of abutment of an inside peripheral face of the valve portion against an inside face of the short-circuit passage while permitting fluid flow through the short-circuit passage between the pressure-receiving chamber and the equilibrium chamber by means of elastic deformation of the valve portion so as to be spaced away from the inside face of the short-circuit passage due to negative pressure of the pressure-receiving chamber acting on the valve portion.

According to the sixth mode, by providing the relief mechanism, at times of input of a large jarring load, an excessive negative pressure of the pressure-receiving chamber will be rapidly dispelled, thereby preventing occurrence of noises due to cavitation. Meanwhile, at times of input of normal vibration, the short-circuit passage is retained in the closed state, effectively attaining vibration damping effect based on the flow action of the fluid through the first and second orifice passages or the like.

Furthermore, since the valve portion that constitutes the relief mechanism is integrally provided to the elastic movable member, increase in the number of components is avoided.

According to the present invention, the switching portion for switching the second orifice passage between the open and closed states is provided to the elastic movable member supported by the partition member. Thus, vibration damping effects based on the flow action of the fluid through the respective first and second orifice passages are both effectively exhibited. Moreover, the switching portion is supported by the clasped portion via the thin portion, so that the switching portion undergoes tilting motion in a swinging manner. This will reduce the striking noise due to abutment against the inside face of the second orifice passage. In addition, by utilizing the tilting motion of the switching portion, even with the vibration of higher frequency than the tuning frequency of the second orifice passage, effective vibration damping action will be attained on the basis of liquid pressure-absorbing action.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
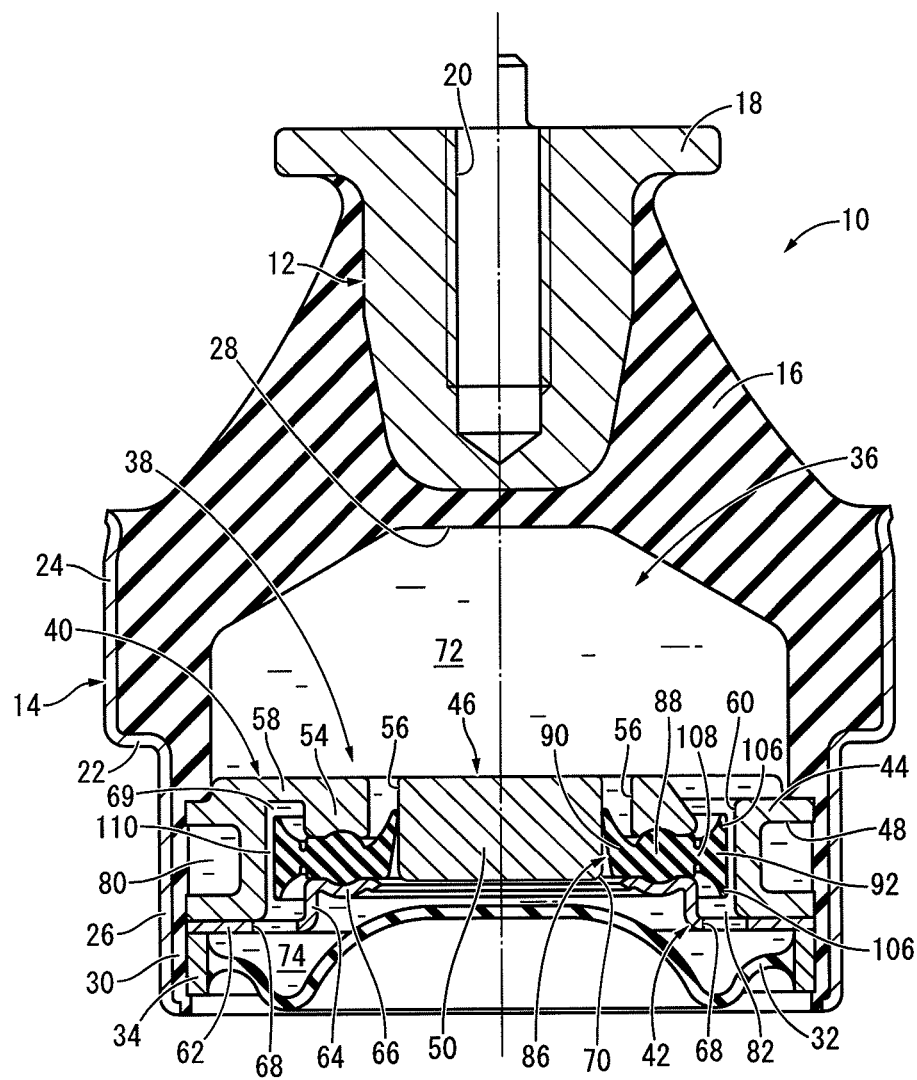
FIG. 1 is an elevational view in axial or vertical cross section showing a fluid-filled type vibration damping device in the form of an engine mount according to a first embodiment of the present invention, taken along line 1-1 of FIG. 2.

Referring first to FIG. 1, there is depicted an automotive engine mount 10 according to a first embodiment of a fluid-filled type vibration damping device constructed in accordance with the present invention. The engine mount 10 has a construction in which a first mounting member 12 and a second mounting member 14 are connected by a main rubber elastic body 16. In the description hereinbelow, as a general rule, the vertical direction refers to the vertical direction in FIG. 1, which coincides with the principal vibration input direction.

Described more specifically, the first mounting member 12 is a high rigidity component of small-diameter, generally circular post shape, and at its axially upper end, has a flange portion 18 that projects peripherally outward. The first mounting member 12 also has a bolt hole 20 that extends on the center axis and opens onto the upper face thereof. The bolt hole 20 is provided with a screw thread on its inside peripheral face.

The second mounting member 14 is a high rigidity component of thin-walled, large-diameter, generally cylindrical shape, and at its axially medial section, has a stepped portion 22. With the axially upper side of the stepped portion 22 being a large-diameter cylinder portion 24 while the axially lower side being a small-diameter cylinder portion 26, the second mounting member 14 has a stepped cylindrical shape overall. In the present embodiment, the entire second mounting member 14 serves as a cylinder portion.

Then, the first mounting member 12 is positioned in the upper opening of the second mounting member 14 so as to be coaxial with the second mounting member 14, while the first mounting member 12 and the second mounting member 14 are elastically connected by the main rubber elastic body 16. The main rubber elastic body 16 has a thick-walled, large-diameter, generally frustoconical shape. The first mounting member 12 is bonded by vulcanization to the small-diameter side end of the main rubber elastic body 16, and the inner circumferential face of the second mounting member 14 is superposed and bonded by vulcanization to the outer circumferential face of the large-diameter side end of the main rubber elastic body 16. In the present embodiment, the main rubber elastic body 16 takes the form of an integrally vulcanization molded component incorporating the first mounting member 12 and the second mounting member 14.

A large-diameter recess 28 of inverted, generally bowl shape is formed opening onto the large-diameter end face (lower face) of the main rubber elastic body 16. Besides, a seal rubber layer 30 is integrally formed with the outer peripheral side of the large-diameter recess 28 of the main rubber elastic body 16 and extends downward. The seal rubber layer 30 is a rubber elastic body of thin-walled, large-diameter, generally cylindrical shape whose outer circumferential face is superposed and bonded by vulcanization to the inner circumferential face of the small-diameter cylinder portion 26 of the second mounting member 14. By so doing, the inner circumferential face of the second mounting member 14 is entirely covered by the rubber elastic body.

A flexible film 32 is attached to the lower opening of the second mounting member 14. The flexible film 32 is a thin rubber film of generally circular disk shape or circular dome shape having ample slack in the vertical direction. In addition, the outer peripheral face of the flexible film 32 is bonded by vulcanization to a fixing member 34 of generally cylindrical shape or annular shape. Then, after the fixing member 34 being inserted into the lower opening of the second mounting member 14, the second mounting member 14 is subjected to a diameter reduction process such as 360-degree radial compression. With this arrangement, the fixing member 34 is fixed to the second mounting member 14 so that the flexible film 32 is supported by the second mounting member 14.

By so doing, the upper opening of the second mounting member 14 is closed off by the main rubber elastic body 16, while the lower opening of the second mounting member 14 is closed off by the flexible film 32, thereby forming a fluid-filled zone 36 between the main rubber elastic body 16 and the flexible film 32. The fluid-filled zone 36 is sealed off from the outside and filled with a non-compressible fluid. While no particular limitation is imposed on the sealed non-compressible fluid filling the fluid-filled zone 36, it would be favorable to use water, an alkylene glycol, a polyalkylene glycol, a silicone oil, a some mixture of these for example. In order to effectively achieve vibration damping effect based on flow action of the fluid (discussed later) a low-viscosity fluid having viscosity of 0.1 Pa·s or lower is preferred.

Figure 2:
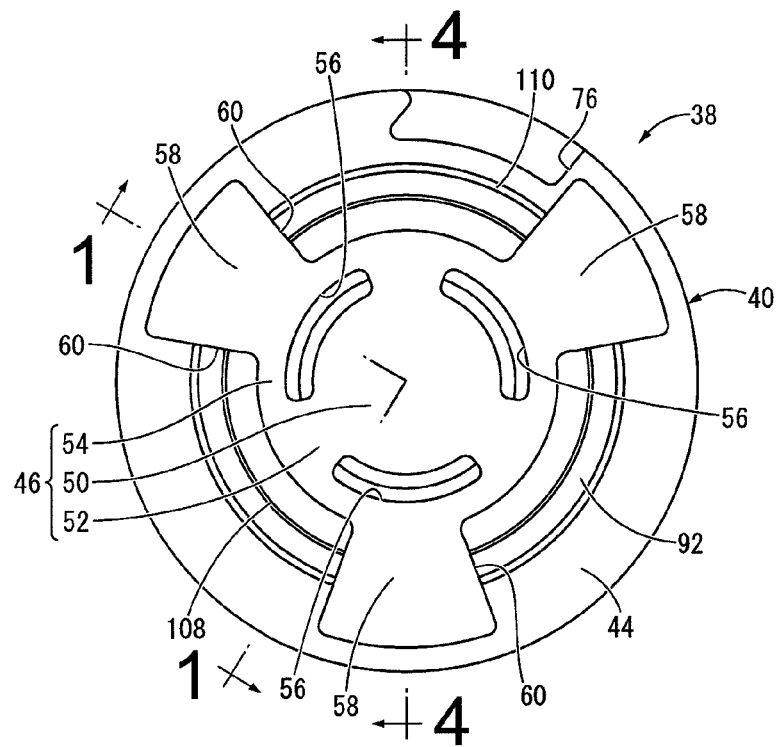
FIG. 2 is a top plane view of a partition member of the engine mount of FIG. 1.
Figure 3:
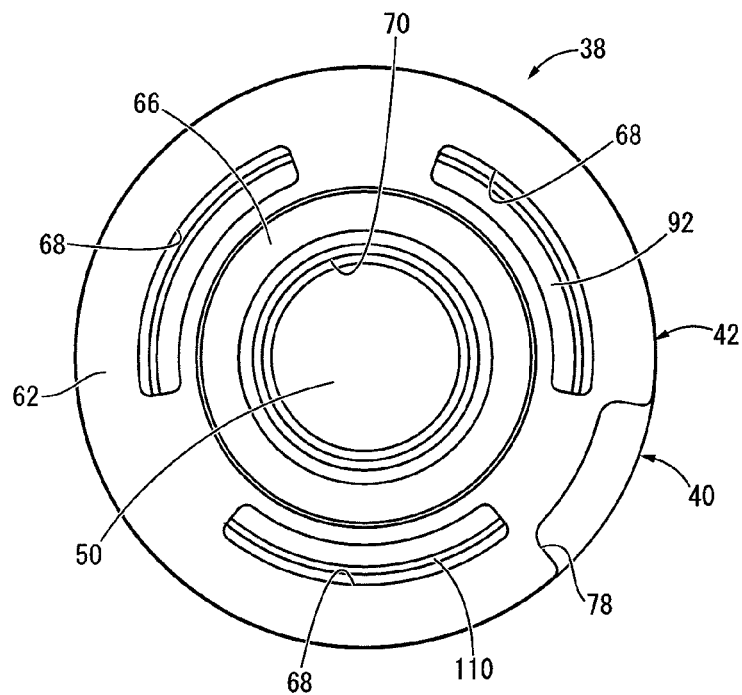
FIG. 3 is a bottom plane view of the partition member of FIG. 2.
Figure 4:
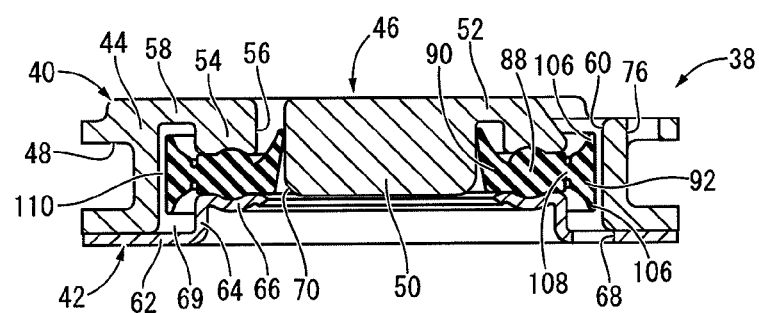
FIG. 4 is a cross sectional view taken along line 4-4 of FIG. 2.

A partition member 38 is disposed within the fluid-filled zone 36. As depicted in FIGS. 2 through 4, the partition member 38 is of thick-walled, large-diameter, generally circular disk shape including a partition member main body 40 and a base plate member 42.

The partition member main body 40 is a high rigidity component of thick-walled, large-diameter, generally circular disk shape overall, and includes an annular outer peripheral portion 44 and a center portion 46 which is inserted into the center hole of the outer peripheral portion 44 and spaced apart therefrom by a prescribed distance in the radial direction. Outer peripheral connecting portions 58 to be described later interconnect the upper ends of the outer peripheral portion 44 and the center portion 46.

Described more specifically, the outer peripheral portion 44 has a large-diameter, annular shape which extends continuously about the entire circumference in the circumferential direction. A slot 48 opens onto the outer circumferential face of the outer peripheral portion 44 and extends just short of once around the circumference. Besides, the center portion 46 disposed in the center hole of the outer peripheral portion 44 has a central abutting section 50 of circular post shape. A flange-shaped inner peripheral connecting portion 52 is integrally formed with the upper end of the central abutting section 50, and a clasping projection 54 is provided to the outer peripheral edge of the inner peripheral connecting portion 52 about the entire circumference and projects downward. In addition, the inner peripheral connecting portion 52 includes at several locations along the circumference (three in the present embodiment) upper through-holes 56 which have a prescribed length in the circumferential direction and pierce the inner peripheral connecting portion 52 in the thickness direction.

Also, the center portion 46 is inserted and positioned within the center hole of the outer peripheral portion 44, so that the inner circumferential face of the outer peripheral portion 44 and the outer circumferential face of the center portion 46 are opposed to each other with a prescribed distance therebetween. Moreover, the outer peripheral portion 44 and the center portion 46 have an integral structure whose upper end portions are interconnected by the outer peripheral connecting portions 58 provided at several locations along the circumference (three in the present embodiment). With this arrangement, the partition member main body 40 including the outer peripheral portion 44 and the center portion 46 is constituted. Note that upper communication holes 60 are formed circumferentially between the outer peripheral connecting portions 58 so as to pass through in the axial direction with a prescribed length in the circumferential direction.

Meanwhile, the base plate member 42 is a high rigidity plate of generally annular disk shape overall. The base plate member 42 includes an outer peripheral support portion 62 of annular disk shape, a tubular stepped portion 64 projecting upward from the inner peripheral edge of the outer peripheral support portion 62, and an internal flange-shaped clasping piece 66 integrally formed with the upper end of the stepped portion 64 and projecting peripherally inward. In addition, a plurality of lower communication holes 68 having a prescribed length in the circumferential direction pierce the inner peripheral portion of the outer peripheral support portion 62 in the thickness direction. Note that the base plate member 42 has an outside diameter dimension substantially equal to that of the partition member main body 40, and an inside diameter dimension substantially equal to that of the clasping projection 54 of the partition member main body 40 while being larger than the diameter of the central abutting section 50.

Then, the partition member main body 40 and the base plate member 42 are superposed in the axial direction and fixed to each other by means of engaging, bonding or the like. In this assembled state, radially between the outer peripheral portion 44 and the central abutting section 50 of the partition member main body 40, the partition member main body 40 and the base plate member 42 are spaced away from each other in the axial direction. This provides an annular housing space 69 formed between axially opposed faces of the partition member main body 40 and the base plate member 42. Besides, the central abutting section 50 of the partition member main body 40 is inserted into the center hole of the base plate member 42, thereby providing an annular lower through-hole 70 between the central abutting section 50 and the clasping piece 66 of the base plate member 42.

The partition member 38 constructed as above is housed within the fluid-filled zone 36 and supported by the second mounting member 14. Described more specifically, the partition member 38 is inserted into the small-diameter cylinder portion 26 of the second mounting member 14. The outer peripheral portion of the partition member 38 is superposed against the lower end face of the main rubber elastic body 16 so that the partition member 38 is positioned in the axial direction. Then, by means of diameter-constricting process of the second mounting member 14, the partition member 38 is fixed to the second mounting member 14 together with the fixing member 34. With this arrangement, the partition member 38 whose outer peripheral portion is supported by the second mounting member 14 is disposed so as to extend in the axis-perpendicular direction within the fluid-filled zone 36.

Moreover, by disposing the partition member 38, the fluid-filled zone 36 is bifurcated into upper and lower parts disposed on either side of the partition member 38. This provides to the upper side of the partition member 38 a pressure-receiving chamber 72 whose wall is partially defined by the main rubber elastic body 16 and that is subjected to internal pressure fluctuations during input of vibration, and to the lower side of the partition member 38 an equilibrium chamber 74 whose wall is partially defined by the flexible film 32 and that readily permits changes in volume. Note that the pressure-receiving chamber 72 and the equilibrium chamber 74 are filled with the non-compressible fluid filling the fluid-filled zone 36.

In addition, the outer circumferential face of the partition member 38 is superposed against the inner circumferential face of the second mounting member 14 via the seal rubber layer 30. With this arrangement, the outer circumferential opening of the slot 48 is sealed off fluid-tightly by the second mounting member 14, thereby forming a tunnel-like passage extending in the circumferential direction. One end of the tunnel-like passage communicates with the pressure-receiving chamber 72 via a first passage hole 76, while the other end thereof communicates with the equilibrium chamber 74 via a second passage hole 78. This provides a first orifice passage 80 that interconnects the pressure-receiving chamber 72 and the equilibrium chamber 74. Note that the first orifice passage 80 is tuned to a low frequency of around 10 Hz that corresponds to engine shake by adjusting the ratio (A/L) of the passage cross sectional area (A) to the passage length (L) in consideration of wall spring rigidity of the pressure-receiving chamber 72 and the equilibrium chamber 74.

Besides, a second orifice passage 82 is formed radially between the center portion 46 and the outer peripheral portion 44. Specifically, in the housing space 69, a ring-shaped area is defined radially between the center portion 46 and the outer peripheral portion 44. The ring-shaped area communicates with the pressure-receiving chamber 72 via the upper communication holes 60 formed circumferentially between the outer peripheral connecting portions 58, while communicating with the equilibrium chamber 74 via the lower communication holes 68 formed in the base plate member 42. This provides the second orifice passage 82 that interconnects the pressure-receiving chamber 72 and the equilibrium chamber 74. Note that the tuning frequency of the second orifice passage 82 is set to a higher frequency than that of the first orifice passage 80. That is, the second orifice passage 82 is tuned to a midrange to high frequency of ten or more Hz and above that corresponds to idling vibration or driving rumble.

Additionally, in the housing space 69, an area defined radially between the central abutting section 50 and the clasping projection 54 communicates with the pressure-receiving chamber 72 via the upper through-hole 56 that pierces the inner peripheral connecting portion 52, while communicating with the equilibrium chamber 74 via the lower through-hole 70 formed radially between the central abutting section 50 and the base plate member 42. With this arrangement, a short-circuit passage 84 described later is formed in the partition member 38 for interconnecting the pressure-receiving chamber 72 and the equilibrium chamber 74 so as to pass through radially between the central abutting section 50 and the clasping projection 54 (see FIG. 7C). Note that with the short-circuit passage 84, it is desirable that the ratio of the passage cross sectional area to the passage length be set still larger than that of the second orifice passage 82 so that the flow resistance is smaller than that of the first and second orifice passages 80, 82.

Figure 5:
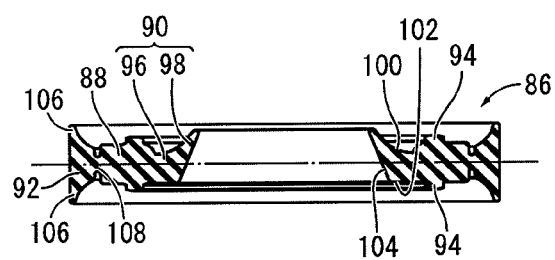
FIG. 5 is a vertical cross sectional view of an elastic movable member of the partition member of FIG. 2.

Furthermore, an elastic movable member 86 is disposed within the housing space 69 of the partition member 38. As depicted in FIG. 5, the elastic movable member 86 is a component of generally annular shape or annular disk shape formed of a rubber elastic body, and is integrally equipped with an annular clasped portion 88, a valve portion 90 provided to the inner peripheral side of the clasped portion 88, and a switching portion 92 provided to the outer peripheral side of the clasped portion 88.

The clasped portion 88 has an annular shape that extends continuously with substantially unchanging cross section about the entire circumference. When viewed in vertical cross section, the clasped portion 88 has a configuration in which an inner peripheral portion of generally circular shape and an outer peripheral portion of generally rectangular shape are combined. Besides, a compressed protrusion 94 that projects in the axially opposite directions is integrally formed with the inner peripheral portion of the clasped portion 88. The outside peripheral face of the clasped portion 88 has a cylindrical shape extending in the substantially axial direction.

A valve portion 90 is integrally formed on the inner peripheral side of the clasped portion 88. The valve portion 90 extends with substantially unchanging cross section about the entire circumference, and includes an outer peripheral basal end 96 projecting peripherally inward from the clasped portion 88 while expanding in the substantially axis-perpendicular direction, and an inner peripheral distal end 98 projecting peripherally inward from the outer peripheral basal end 96. In addition, the upper face of the outer peripheral basal end 96 and the inner peripheral distal end 98 are defined by a smooth concave curve surface 100. Meanwhile, the lower face of the outer peripheral basal end 96 is defined by an axis-perpendicular plane 102 that expands in the substantially axis-perpendicular direction, and the lower face of the inner peripheral distal end 98 is defined by a tapered surface 104 that progressively slopes upward towards the inner peripheral side. With this arrangement, the outer peripheral basal end 96 becomes slightly thicker towards the inner peripheral side and expands in the substantially axis-perpendicular direction, while the inner peripheral distal end 98 becomes gradually thinner towards the inner peripheral side so as to have tapered contours that progressively slopes upward towards the inner peripheral side. Since the inner peripheral distal end 98 becomes thinner towards its projecting distal end, the valve portion 90 is made thicker in the outer peripheral portion rather than in the inner peripheral portion. Also, the outermost circumference part of the valve portion 90 has a thickness dimension smaller than the maximum thickness dimension of the clasped portion 88 (namely, the diameter of the circular inner peripheral portion when viewed in vertical cross section). Besides, since the upper face of the valve portion 90 is defined by the concave curve surface 100 that progressively slopes upward towards the inner peripheral side, there is formed a valley line at the boundary between the clasped portion 88 and the valve portion 90 on the upper face.

A switching portion 92 is provided to the outer peripheral side of the clasped portion 88. The switching portion 92 has an annular shape that extends continuously with substantially unchanging cross section about the entire circumference, and its inside and outside peripheral faces have concentric cylindrical shapes. Note that the switching portion 92 progressively becomes thicker towards the outer peripheral side.

Also, the switching portion 92 has the axially opposite faces each defined by a concave curving surface whose slope angle becomes larger towards the outer peripheral side with respect to the axis-perpendicular direction. An abutting portion 106 is provided at the outer peripheral edge of the switching portion 92 and projects mostly to axially outer sides. The abutting portion 106 progressively becomes narrower in the radial direction towards the axially outer side (towards the projecting distal end thereof), and its projecting distal end face is constituted by an arcuate curving surface. Note that when viewed in vertical cross section, the switching portion 92 including the abutting portion 106 is axisymmetric in shape with respect to the centerline in its thickness direction (which is indicated by the dot-and-dash line in FIG. 5).

Moreover, the switching portion 92 connects with the clasped portion 88 via a thin portion 108, and is integrally formed with the clasped portion 88. The thin portion 108 is provided radially between and at the axially center section of the outside peripheral face of the clasped portion 88 and the inside peripheral face of the switching portion 92, while being made thinner than both of the outer peripheral edge and the inner peripheral edge of the switching portion 92. With this arrangement, a tilting motion of the switching portion 92 is permitted with respect to the clasped portion 88 through elastic deformation of the thin portion 108.

Furthermore, in the present embodiment, the thin portion 108 is constricted in width in the radial direction, so that the outside peripheral face of the clasped portion 88 and the inside peripheral face of the switching portion 92 are opposed to each other with a short distance therebetween in the radial direction. As a result, when the switching portion 92 undergoes an appreciable tilting motion with respect to the clasped portion 88, the inside peripheral face of the switching portion 92 comes into abutment against the outside peripheral face of the clasped portion 88 on axially outer side of the thin portion 108. By so doing, a regulating mechanism for regulating the amount of the tilting motion of the switching portion 92 relative to the clasped portion 88 is constituted by means of abutment between the clasped portion 88 and the switching portion 92 at the thin portion 108.

Figure 6:
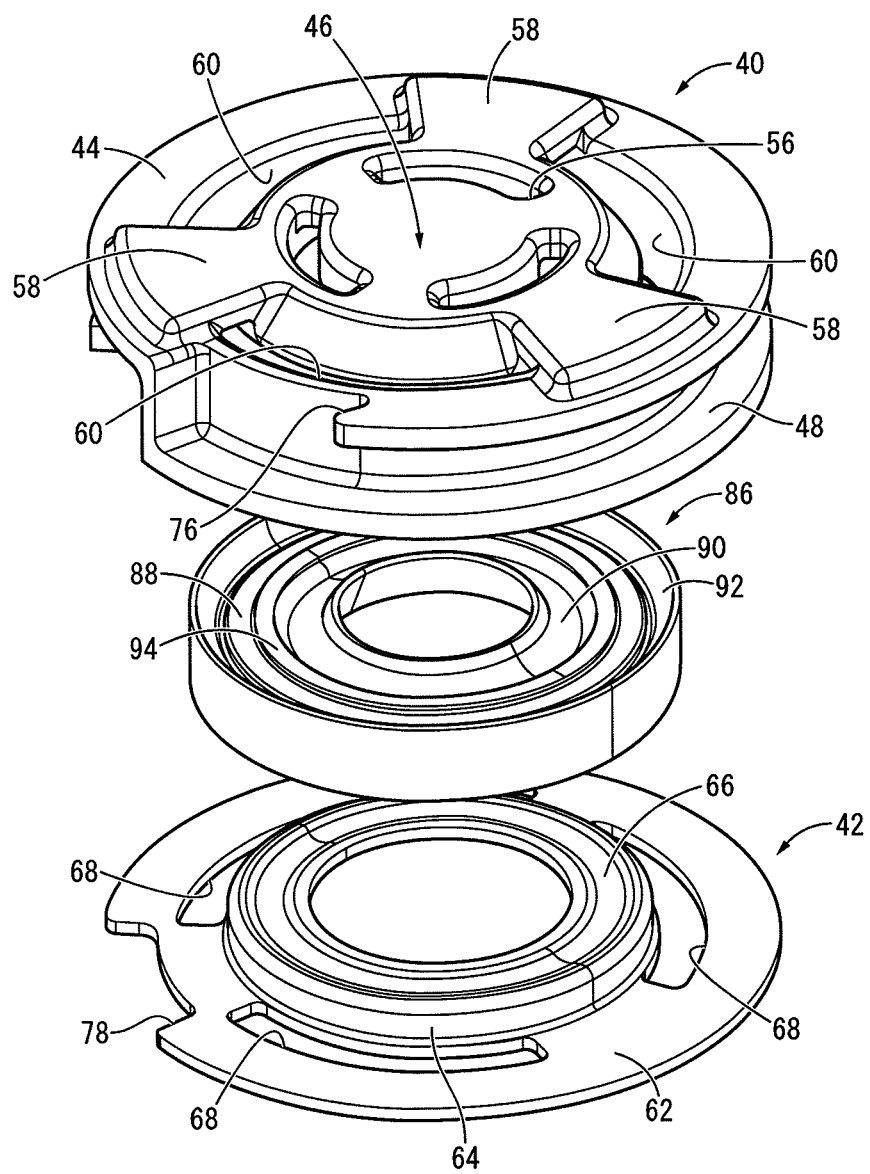
FIG. 6 is an exploded perspective view of the partition member of FIG. 2.

The elastic movable member 86 of the above construction is disposed between the partition member main body 40 and the base plate member 42 (see FIG. 6). Specifically, the clasped portion 88 of the elastic movable member 86 is positioned between axially opposed faces of the clasping projection 54 of the partition member main body 40 and the clasping piece 66 of the base plate member 42, and is clasped between and supported by the clasping projection 54 and the clasping piece 66 in the axial direction. Here, the compressed protrusion 94 integrally formed with the clasped portion 88 is greatly compressed between the clasping projection 54 and the clasping piece 66, thereby sufficiently achieving positioning action of the elastic movable member 86 with respect to the partition member 38.

In addition, the valve portion 90 of the elastic movable member 86 is disposed radially between the clasping projection 54 and the central abutting section 50. The valve portion 90 projects peripherally inward beyond the base plate member 42 and is pressed against the outside peripheral face of the central abutting section 50. With this arrangement, in the stationary state in the absence of input vibration, the valve portion 90 is disposed on the fluid flow path of the short-circuit passage 84 so that the short-circuit passage 84 is closed by the valve portion 90. Furthermore, the fluid pressure of the pressure-receiving chamber 72 is exerted on the upper face of the valve portion 90 via the short-circuit passage 84 (upper through-hole 56), while the fluid pressure of the equilibrium chamber 74 is exerted on the lower face of the valve portion 90 via the short-circuit passage 84 (lower through-hole 70). Note that while it would also be acceptable for the valve portion 90 to be in abutment against the central abutting section 50 without being compressed, in the present embodiment, the valve portion 90 is pressed and pre-compressed against the central abutting section 50 in the radial direction.

On the other hand, the switching portion 92 of the elastic movable member 86 is disposed radially between the outer peripheral portion 44 and the center portion 46 so as to be positioned on the fluid flow path of the second orifice passage 82. Besides, the outside peripheral face of the switching portion 92 is positioned radially inward of the inner circumferential face of the outer peripheral portion 44 so as to be in opposition thereto with a prescribed distance, so that an annular gap 110 is formed radially between the outside peripheral face of the switching portion 92 and the inner circumferential face of the outer peripheral portion 44 and extends continuously in the axial direction. By so doing, in the stationary state in the absence of input vibration, the second orifice passage 82 is open through the gap 110. Additionally, the fluid pressure of the pressure-receiving chamber 72 is exerted on the upper face of the switching portion 92 via the second orifice passage 82 (upper communication holes 60), while the fluid pressure of the equilibrium chamber 74 is exerted on the lower face of the switching portion 92 via the second orifice passage 82 (lower communication holes 68). It should be appreciated that in the stationary state, since the abutting portion 106 projects to opposite sides as viewed in the lengthwise direction of the second orifice passage 82 (the vertical direction in FIG. 1), the second orifice passage 82 is open without being blocked by the abutting portion 106.

The engine mount 10 of the above construction is arranged such that the first mounting member 12 is mounted onto a power unit (not shown) while the second mounting member 14 is mounted onto a vehicle body (not shown), thereby providing vibration damping support of the power unit on the vehicle body via the engine mount 10.

With the engine mount 10 mounted onto the vehicle, at times of input of low-frequency, large-amplitude vibration corresponding to engine shake, fluid flow will be produced through the first orifice passage 80 between the pressure-receiving chamber 72 and the equilibrium chamber 74 based on internal pressure fluctuations within the pressure-receiving chamber 72 relative to the equilibrium chamber 74. By so doing, desired vibration damping effect (high attenuating or damping action) will be exhibited based on resonance action or other flow action of the fluid.

Figure 7A:
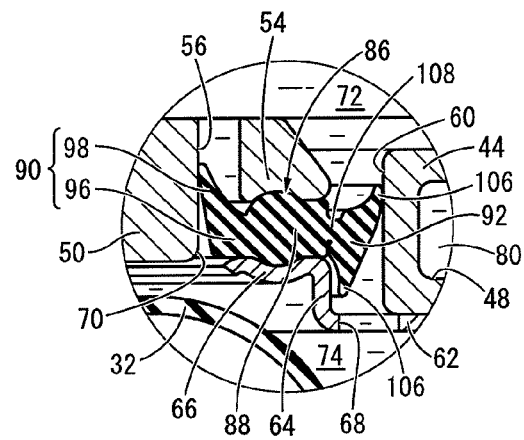
FIGS. 7A-7C are enlarged cross sectional views each showing a principle part of the partition member of FIG. 2, wherein FIG. 7A indicates a situation where vibration corresponding to engine shake is input, FIG. 7B indicates a situation where vibration corresponding to idling vibration is input, and FIG. 7C indicates a situation where an excessive negative pressure is applied to a pressure-receiving chamber.

Moreover, at times of input of low-frequency, large-amplitude vibration, as depicted in FIG. 7A, the switching portion 92 closes the second orifice passage 82. Specifically, when low-frequency, large-amplitude vibration corresponding to engine shake is input, based on a differential in fluid pressure between the pressure-receiving chamber 72 and the equilibrium chamber 74, the switching portion 92, which is connected to the clasped portion 88 via the thin portion 108, undergoes a tilting motion with respect to the clasped portion 88 through elastic deformation of the thin portion 108. Accordingly, the outside peripheral face of the abutting portion 106 that projects from the switching portion 92 in the lengthwise direction of the second orifice passage 82 is pressed against the inner circumferential face of the outer peripheral portion 44 of the partition member main body 40 that constitutes the inside face of the second orifice passage 82. As a result, the second orifice passage 82 is closed by the switching portion 92, and the fluid pressure of pressure-receiving chamber 72 is prevented from being transmitted to the equilibrium chamber 74 through the second orifice passage 82. Thus, sufficient amount of fluid flow can be efficiently obtained through the first orifice passage 80. Note that while FIG. 7A shows the state where a positive pressure is applied to the pressure-receiving chamber 72, also in the state where a negative pressure is applied, the abutting portion 106 is pressed at its lower side against the inner circumferential face of the outer peripheral portion 44 so that the second orifice passage 82 is closed by the switching portion 92.

In addition, in the present embodiment, there is provided the regulating mechanism for regulating the amount of the tilting motion of the switching portion 92 relative to the clasped portion 88 by means of abutment between the inside peripheral face of the switching portion 92 and the outside peripheral face of the clasped portion 88. Therefore, at times of input of low-frequency, large-amplitude vibration, the switching portion 92 is stably retained at the closing position of the second orifice passage 82, thereby preventing the fluid pressure of the pressure-receiving chamber 72 from escaping to the equilibrium chamber 74 through the second orifice passage 82.

Figure 7B:
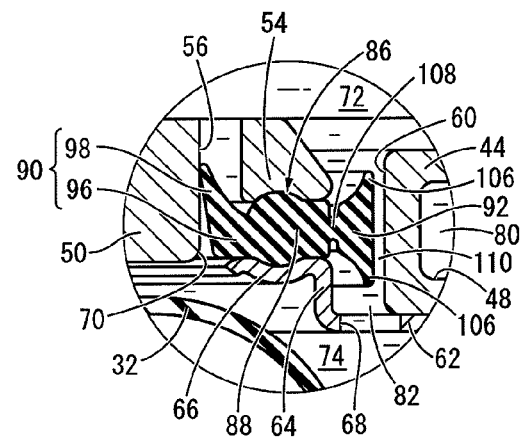

Meanwhile, at times of input of midrange-frequency, small-amplitude vibration corresponding to idling vibration or the like, as depicted in FIG. 7B, the second orifice passage 82 is opened for interconnecting the pressure-receiving chamber 72 and the equilibrium chamber 74 by means of the abutting portion 106 of the switching portion 92 being retained so as to be spaced away from the inside face of the second orifice passage 82. This will actively produce fluid flow through the second orifice passage 82, thereby attaining desired vibration damping effect (low dynamic spring effect) on the basis of flow action of the fluid. In this way, the engine mount 10 is furnished with a switching mechanism constituted for switching the second orifice passage 82 between open and closed states utilizing the tilting motion of the switching portion 92 according to the amplitude of the input vibration. Note that the first orifice passage 80, which is tuned to a lower frequency than the input vibration, is substantially closed due to antiresonance or the like. Thus, sufficient amount of fluid flow through the second orifice passage 82 is efficiently obtained.

Furthermore, at times of input of high-frequency, small-amplitude vibration corresponding to driving rumble or the like, in the open state of the second orifice passage 82 depicted in FIG. 7B, the second orifice passage 82 is substantially closed due to antiresonance, while the switching portion 92 vibrates with minute amplitude in the vertical direction. Accordingly, the fluid pressure of the pressure-receiving chamber 72 is transmitted to the equilibrium chamber 74, so that the pressure-receiving chamber 72 is prevented from being substantially sealed off. Thus, desired vibration damping effect (low dynamic spring effect) will be effectively exhibited on the basis of liquid pressure-absorbing action.

In this way, by switching the second orifice passage 82 between the open and closed states, the engine mount 10 is able to selectively exhibit vibration damping effect through the first orifice passage 80 and vibration damping effect through the second orifice passage 82 according to the frequency of the input vibration. Besides, even for the vibration of higher frequency than the tuning frequency of the second orifice passage 82, the switching portion 92 functions as a movable membrane and is able to obtain effective vibration damping action. Therefore, with the engine mount 10, it is possible to achieve excellent vibration damping effect against vibration over a wide frequency range.

Also, the switching portion 92 undergoes a tilting motion relative to the clasped portion 88 due to the fluid pressure acting in the axial direction, and the abutting portion 106 comes into abutment against the inside face of the second orifice passage 82. Thus, the direction of action of the fluid pressure and the direction of abutment of the abutting portion 106 against the inside face of the second orifice passage 82 are different from each other. Therefore, impact force will be reduced during abutment between the abutting portion 106 and the inside face of the second orifice passage 82, thereby preventing occurrence of contact noise.

Moreover, as the amount of the tilting motion of the switching portion 92 relative to the clasped portion 88 becomes larger, the tilting motion will be more strongly limited on the basis of elasticity of the thin portion 108, thereby decreasing speed of the tilting motion of the switching portion 92. At the time of abutment of the abutting portion 106 against the inside face of the second orifice passage 82, the amount of the tilting motion of the switching portion 92 is sufficiently large. Thus, the speed of the tilting motion of the switching portion 92 is limited, thereby reducing the impact force at the time of the abutment. This makes it possible to prevent occurrence of striking noise due to abutment of the abutting portion 106 against the inside face of the second orifice passage 82.

In addition, the abutting portion 106, which projects from the switching portion 92 and is made thin (narrow) in the radial direction, is adapted to come into abutment against the inside face of the second orifice passage 82. Accordingly, the impact during abutment will be absorbed by the shear deformation of the abutting portion 106, thereby more effectively reducing the striking noise.

Besides, the abutting portion 106 is provided at the outer peripheral edge of the switching portion 92. Thus, an ample width of the gap 110 in the radial direction will be ensured without increasing the amount of the tilting motion of the switching portion 92 required for closing the second orifice passage 82. Therefore, it is possible to sufficiently obtain the substantial passage cross sectional area of the second orifice passage 82 with excellent space efficiency, thereby achieving a great degree of freedom in tuning the second orifice passage 82.

Furthermore, the switching portion 92 becomes progressively thicker towards the outer peripheral side, and in association therewith, the abutting portion 106 becomes progressively narrower towards its projecting distal end. At the time of abutment of the abutting portion 106 against the inside face of the second orifice passage 82, the abutting portion 106 gradually comes into abutment starting with its narrow distal end. Thus, the impact force during initial abutment for which occurrence of striking noise is likely to be a problem will be ameliorated, thereby preventing occurrence of the striking noise. Subsequently, the amount of abutment of the abutting portion 106 against the inside face of the second orifice passage 82 increases and the abutment area gradually broadens towards its proximal end of wider width. Accordingly, the tilting motion of the switching portion 92 is limited due to elasticity of the abutting portion 106, so that the switching portion 92 will be stably retained at the closing position of the second orifice passage 82. Note that the engine mount 10 is provided with the regulating mechanism utilizing abutment between the inside peripheral face of the switching portion 92 and the outside peripheral face of the clasped portion 88, which regulates the amount of the tilting motion of the switching portion 92 in cooperation with the elasticity of the abutting portion 106.

Additionally, since the elastic movable member 86 has an annular shape and the clasped portion 88 is provided continuously about the entire circumference, the elastic movable member 86 is stably clasped between the partition member main body 40 and the base plate member 42. Also, since the switching portion 92 is provided continuously about the entire circumference, when closing the second orifice passage 82, the fluidtightness can be readily obtained. Concomitantly, it is possible to ensure a large passage cross sectional area of the second orifice passage 82 without needing increase in size of the partition member 38.

Figure 7C:
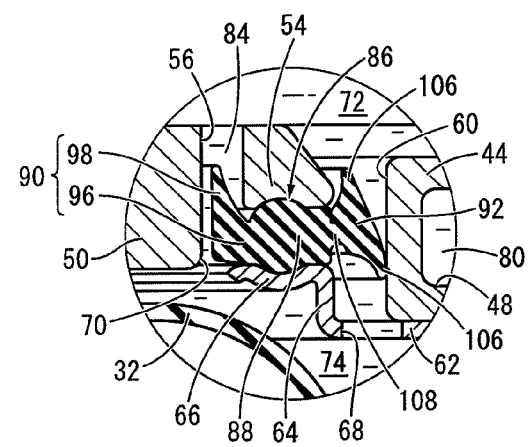

On the other hand, when the vehicle drives over a bump or the like during driving, a large jarring load is input across the first mounting member 12 and the second mounting member 14. Consequently, the pressure-receiving chamber 72 is subjected to an excessive negative pressure, and as depicted in FIG. 7C, the valve portion 90 undergoes elastic deformation. Specifically, by means of the valve portion 90 being suctioned towards the pressure-receiving chamber 72 on the basis of relative pressure differential between the pressure-receiving chamber 72 and the equilibrium chamber 74, the valve portion 90 is spaced away from the central abutting section 50, forming a gap between the valve portion 90 and the central abutting section 50. By so doing, the short-circuit passage 84 that interconnects the pressure-receiving chamber 72 and the equilibrium chamber 74 is opened, permitting fluid flow through the short-circuit passage 84 from the equilibrium chamber 74 into the pressure-receiving chamber 72. The negative pressure within the pressure-receiving chamber 72 will be rapidly reduced or dispelled thereby. As a result, occurrence of bubbles caused by cavitation will be minimized, thereby reducing shockwaves arising during dissipation of the bubbles. Thus, cavitation noise will be reduced or avoided. Note that with the short-circuit passage 84, the ratio (A/L) of the passage cross sectional area (A) to the passage length (L) is set even greater than that of the second orifice passage 82, so that flow resistance of the fluid is set smaller than that of the first and second orifice passages 80, 82. Also, in the engine mount 10, a relief mechanism is constituted including the short-circuit passage 84 for permitting communication between the pressure-receiving chamber 72 and the equilibrium chamber 74 as well as the valve portion 90 for switching the short-circuit passage 84 between open and closed states.

Moreover, the valve portion 90 that constitutes the relief mechanism is integrally provided to the elastic movable member 86. This will avoid increase in the number of components due to providing the relief mechanism, thereby preventing increase in the number of assembly operation steps of the components or the like as well.

It should be appreciated that when a positive pressure is applied to the pressure-receiving chamber 72, the valve portion 90 is more strongly pressed against the central abutting section 50, whereby the short-circuit passage 84 is retained in the closed state. Accordingly, during acting of the positive pressure for which occurrence of cavitation noise does not pose any problems, internal pressure in the pressure-receiving chamber 72 is ensured without escaping to the equilibrium chamber 74 through the short-circuit passage 84. Thus, vibration damping effect by the fluid flow through the first orifice passage 80 will be exhibited.

An embodiment of the present invention has been described in detail above, but the present invention is not limited to those specific descriptions. For example, the valve portion 90 is not essential to the elastic movable member. The elastic movable member may alternatively be constituted by the clasped portion 88 supported by the partition member 38 and the switching portion 92 integrally provided to the clasped portion 88 via the thin portion 108. In this case, it is to be understood that the short-circuit passage 84 provided to the partition member 38 in the preceding embodiment is not necessary.

Also, the shape of the abutting portion 106 provided to the switching portion 92 is not limited to the one that progressively becomes narrower towards its distal end, as illustrated in the preceding embodiment. The abutting portion 106 may, for example, has a generally unchanging width dimension from its basal end to its distal end. Besides, the abutting portion 106 is not necessarily be provided to the outer peripheral edge of the switching portion 92, but may be provided to the radially middle section or the inner peripheral edge of the switching portion 92.

In addition, the elastic movable member is not necessarily be limited to an annular or annular disk shape. Similarly, neither the clasped portion nor the switching portion that constitutes the elastic movable member is limited to an annular shape. For example, it would also be acceptable that the switching portion is disposed only on the fluid flow path of the second orifice passage 82 which is provided partially along the circumference, and therefore has a length less than once around the circumference.

Furthermore, while it is desirable that the thin portion 108 be constricted in width in the radial direction so as to constitute the regulating mechanism for regulating the amount of the tilting motion of the switching portion 92, it would also be possible for example that the radial dimension (width dimension) of the thin portion 108 is made larger so that the switching portion 92 readily undergoes the tilting motion. That is, the width dimension of the thin portion 108 is to be appropriately set depending on the required ability, and is not necessarily set such that the outside peripheral face of the clasped portion 88 and the inside peripheral face of the switching portion 92 come into abutment.

Moreover, the present invention is not always limited to engine mounts only, and is adaptable to implementation in body mounts, sub-frame mounts, differential mounts or the like. Additionally, the fluid-filled type vibration damping device according to the present invention is not limited to implementation in automobiles, and may preferably be implemented in motorized two wheeled vehicles, rail vehicles, industrial vehicles or the like.

What is claimed is:

1. A fluid-filled type vibration damping device comprising:
    a first mounting member;
    a second mounting member having a cylinder portion;
    a main rubber elastic body elastically connecting the first and second mounting members;
    a partition member supported by the second mounting member;
    a pressure-receiving chamber whose wall is partially defined by the main rubber elastic body;
    an equilibrium chamber whose wall is partially defined by a flexible film, the pressure-receiving chamber and the equilibrium chamber being disposed on either side of the partition member and filled with a non-compressible fluid;
    a first orifice passage and a second orifice passage interconnecting the pressure-receiving chamber and the equilibrium chamber, with the second orifice passage being tuned to a higher frequency than the first orifice passage; and
    an elastic movable member attached to the partition member,
    wherein a clasped portion clasped by the partition member is provided to the elastic movable member, and a switching portion is provided to an outer peripheral side of the clasped portion and positioned in a fluid flow path of the second orifice passage, while fluid pressure of the pressure-receiving chamber is exerted on one side of the switching portion and fluid pressure of the equilibrium chamber is exerted on another side of the switching portion,
    wherein an abutting portion is provided to the switching portion so as to project to opposite sides as viewed in a lengthwise direction of the second orifice passage,
    wherein a thin portion is provided between the clasped portion and the switching portion so that a tilting motion of the switching portion is permitted relative to the clasped portion through elastic deformation of the thin portion,
    wherein a switching mechanism is constituted for opening the second orifice passage through a gap formed between an outside peripheral face of the switching portion and an inside face of the second orifice passage while closing the second orifice passage by the tilting motion of the switching portion around the thin portion relative to the clasped portion based on relative pressure fluctuations of the pressure-receiving chamber and the equilibrium chamber so that an outside peripheral face of the abutting portion of the switching portion comes into abutment against the inside face of the second orifice passage, and wherein the abutting portion is provided at opposing ends of the switching portion so as to be positioned on both sides of the thin portion in an axial direction of the damping device.

2. The fluid-filled type vibration damping device according to claim 1, wherein the elastic movable member has an annular shape, and both of the clasped portion and the switching portion are provided continuously about an entire circumference of the elastic movable member.

3. The fluid-filled type vibration damping device according to claim 1, wherein the thin portion is constricted in width, and a regulating mechanism for regulating an amount of the tilting motion of the switching portion relative to the clasped portion is constituted by an abutment between the switching portion and the clasped portion at the thin portion.

4. The fluid-filled type vibration damping device according to claim 1, wherein the abutting portion is provided at an outer peripheral edge of the switching portion.

5. The fluid-filled type vibration damping device according to claim 4, wherein the switching portion progressively becomes thicker towards an outer peripheral side, while the abutting portion progressively becomes narrower towards a projecting distal end thereof.

6. A fluid-filled type vibration damping device comprising:
a first mounting member;
a second mounting member having a cylinder portion;
a main rubber elastic body elastically connecting the first and second mounting members;
a partition member supported by the second mounting member;
a pressure-receiving chamber whose wall is partially defined by the main rubber elastic body;
an equilibrium chamber whose wall is partially defined by a flexible film, the pressure-receiving chamber and the equilibrium chamber being disposed on either side of the partition member and filled with a non-compressible fluid;
a first orifice passage and a second orifice passage interconnecting the pressure-receiving chamber and the equilibrium chamber, with the second orifice passage being tuned to a higher frequency than the first orifice passage; and an elastic movable member attached to the partition member, wherein a clasped portion clasped by the partition member is provided to the elastic movable member, and a switching portion is provided to an outer peripheral side of the clasped portion and positioned in a fluid flow path of the second orifice passage, while fluid pressure of the pressure-receiving chamber is exerted on one side of the switching portion and fluid pressure of the equilibrium chamber is exerted on another side of the switching portion, wherein an abutting portion is provided to the switching portion so as to project to opposite sides as viewed in a lengthwise direction of the second orifice passage, wherein a thin portion is provided between the clasped portion and the switching portion so that a tilting motion of the switching portion is permitted relative to the clasped portion through elastic deformation of the thin portion, wherein a switching mechanism is constituted for opening the second orifice passage through a gap formed between an outside peripheral face of the switching portion and an inside face of the second orifice passage while closing the second orifice passage by the tilting motion of the switching portion around the thin portion relative to the clasped portion based on relative pressure fluctuations of the pressure-receiving chamber and the equilibrium chamber so that an outside peripheral face of the abutting portion of the switching portion comes into abutment against the inside face of the second orifice passage, and wherein a valve portion is integrally formed on an inner peripheral side of the clasped portion, wherein a short-circuit passage is formed in the partition member for interconnecting the pressure-receiving chamber and the equilibrium chamber, and the valve portion is disposed on the short-circuit passage, and wherein a relief mechanism is constituted for closing the short-circuit passage by an abutment of an inside peripheral face of the valve portion against an inside face of the short-circuit passage while permitting fluid flow through the short-circuit passage between the pressure-receiving chamber and the equilibrium chamber by elastic deformation of the valve portion so as to be spaced away from the inside face of the short-circuit passage due to negative pressure of the pressure-receiving chamber acting on the valve portion.

* * * * *